United States Patent [19]

Raehse et al.

[11] Patent Number: 5,537,759
[45] Date of Patent: Jul. 23, 1996

[54] PROCESS FOR DRYING USEFUL MATERIALS FOR DETERGENTS AND CLEANING PRODUCTS USING SUPERHEATED STEAM

[75] Inventors: Wilfried Raehse, Duesseldorf; Johann-Friedrich Fues, Grevenbroich; Otto Koch, Leichlingen; Joerg-Martin Schmidt, Duesseldorf, all of Germany

[73] Assignee: Henkel Kommanditgesellschaft auf Aktien, Duesseldorf, Germany

[21] Appl. No.: 284,618

[22] PCT Filed: Feb. 4, 1993

[86] PCT No.: PCT/EP93/00267

§ 371 Date: Oct. 12, 1994

§ 102(e) Date: Oct. 12, 1994

[87] PCT Pub. No.: WO93/15814

PCT Pub. Date: Aug. 19, 1994

[30] Foreign Application Priority Data

Feb. 12, 1992 [DE] Germany ............... 42 04 035.3

[51] Int. Cl.$^6$ ........................... F26B 5/04
[52] U.S. Cl. ........................... 34/411; 34/372
[58] Field of Search ............... 34/411, 372, 373, 34/374, 375

[56] References Cited

U.S. PATENT DOCUMENTS

| | | |
|---|---|---|
| 2,636,973 | 5/1953 | Fritz .......................... 34/374 |
| 3,946,495 | 3/1976 | Osdor . |
| 4,102,057 | 7/1978 | Key et al. ..................... 34/372 |
| 4,144,226 | 3/1979 | Crutchfield et al. . |
| 4,146,495 | 3/1979 | Crutchfield et al. . |
| 4,171,243 | 10/1979 | Brooks et al. . |
| 4,345,384 | 8/1982 | Pagnozzi et al. ............... 34/411 |
| 5,223,088 | 6/1993 | Hansen ........................ 34/372 |

FOREIGN PATENT DOCUMENTS

| | | |
|---|---|---|
| 2002088 | 10/1969 | France . |
| 2412837 | 10/1974 | Germany . |
| 4030688 | 4/1992 | Germany . |
| 9205849 | 4/1992 | WIPO . |

OTHER PUBLICATIONS

Trommelen and Crosby; "Evaporation and Drying of Drops in Superheated Vapors", AIChE Journal, vol. 16, No. 5.
Beeby and Potter; "Steam Drying", Plenary Lecture, 1984.
Stein; "Berechnung der Verdampfung von Fleussigkeit aus feuchten Produkten im Spruehturm", 1973.

*Primary Examiner*—John T. Kwon
*Attorney, Agent, or Firm*—Ernest G. Szoke; Wayne C. Jaeschke; Real J. Grandmaison

[57] ABSTRACT

A process for the drying of water-containing materials which are suitable for use as wetting agents, detergents or cleaning products. An aqueous solution, emulsion or suspension of the materials is dried using superheated steam as the drying gas wherein the drying gas is recycled to the drying zone after removal therefrom of evaporated water and the energy required for the evaporation of water is supplied to the superheated steam by heat exchangers.

18 Claims, No Drawings

PROCESS FOR DRYING USEFUL MATERIALS FOR DETERGENTS AND CLEANING PRODUCTS USING SUPERHEATED STEAM

BACKGROUND OF THE INVENTION

Field of the Invention

This invention relates to an improved process for the production of high-quality, fine-particle, solid pourable or free-flowing useful materials or mixtures of useful materials suitable for use as and/or in wetting agents, detergents and/or cleaning products, from aqueous preparations thereof. The process according to the invention involves one or more drying steps using superheated steam as the drying gas.

The spray drying of aqueous preparations of useful materials of the type mentioned, which are widely used, for example, as laundry detergents, has been carried out on an industrial scale for decades. Hot air or mixtures of air and hot waste combustion gases are used as the drying gas stream. Washing powders or useful materials and/or mixtures of useful materials for the production of laundry detergents in pourable and free-flowing powder form are produced in corresponding spray drying towers, generally at ambient pressure, either in co-current or more often in countercurrent.

In their earlier application DE-A 40 30 688, applicants describe a process for the production of solid, fine-particle pourable and free-flowing useful materials or mixtures thereof for wetting agents, detergents and/or cleaning products from aqueous preparations thereof, superheated steam being used as the drying hot gas stream and drying of the particulate material being terminated before it is endangered by heat. If necessary, the long-term pourability and free-flow of the material thus partly dried is ensured by addition of mixture constituents which are capable of binding limited quantities of water. In addition to or instead of this measure, the particulate material may also be aftertreated to homogenize its residual moisture content and/or after-dried under conditions which do not affect the useful material. The teaching of the invention described hereinafter is concerned with a specific embodiment of this process according to the earlier application cited above. The teaching according to the invention seeks to enable high-quality useful materials or mixtures of useful materials of the type in question to be obtained where superheated steam is used as the drying gas. The problem addressed by the present invention will become clear from the following considerations presented purely by way of example:

The requirements which high-quality detergents, particularly laundry detergents, are now having to satisfy in practice are not confined to performance expectations. The visual appearance, for example a light color in the case of laundry detergents, and other physical properties, such as free flow, a high apparent density, rapid dissolution in water and good dispensing properties and the like, are also important requirements.

The problem addressed by the present invention was to provide optimized conditions for the application in question of drying useful materials with superheated steam as drying medium to enable the high-quality useful materials or mixtures of useful materials to be obtained in the dry state.

It is important in this connection to bear in mind the fact that practical experience in the application of drying processes using superheated steam as the drying gas has been very limited up till now although, basically, this technology has been known since the beginning of this century and has been repeatedly described in the literature. Earlier application DE-A 40 30 688 deals in detail with the relevant prior-art literature. Reference is made here to the corresponding observations in the earlier application and solely to the following publications which in turn cite numerous publications on this subject: A. M. Trommelen et al. "Evaporation and Drying of Drops in Super-heated Vapors" AIChE Journal 16 (1970) 857–867; Colin Beeby et al. "STEAM DRYING" Plenary Lecture, Proc. 4th Int. Drying Sym. Kyoto (eds. R. Toei and Arun S. Mujumdar) 1984, Vol. 1, 51–68 and W. A. Stein "Berechnung der Verdampfung von Flüssigkeit aus feuchten Produkten im Sprühturm (Calculating the Evaporation of Liquid from Moist Products in Spray Drying Towers)" Verfahrenstechnik 7 (1973), 262–267.

DESCRIPTION OF THE INVENTION

The present invention relates to the solution to the problem stated above of obtaining in various ways high-quality useful materials or mixtures of useful materials which are suitable for use as, and/or in, wetting agents, detergents and/or cleaning products. More particularly, the invention relates to a process for drying these water-containing useful materials or mixtures of useful materials, which may even be present as aqueous preparations, using superheated steam as the drying gas which is recycled to the drying stage after removal of the evaporated water from the circuit. The process according to the invention is characterized in that the energy required for the evaporation of water is supplied to the circulating steam at least by far predominantly and preferably solely by indirect heat exchange. In addition, In one preferred embodiment, the process is carried out with internal pressures of the steam-filled system in the region of normal pressure. In this embodiment, however, such elevated pressures are established in the circuit that air can be reliably prevented from penetrating the steam-filled circuit, for example in damaged areas which can never be completely ruled out in industrial installations.

It has been found that adherence to these working conditions with steam, for example in the production of useful materials or mixtures of useful materials for laundry detergents, affords new possibilities which are not available in drying processes hitherto carried out industrially with hot air and/or waste gases. This is evidently attributable on the one hand to the course of drying of the useful material to be dried—which is characteristic of drying operations in the superheated steam atmosphere—and, on the other hand, to the reliable and total absence of pollutants, particularly oxygen and carbon dioxide, in the drying gas based on the superheated steam. Unwanted oxidation of the material to be dried is ruled out as is the formation of carbonate salts or carbonate deposits that are unavoidable in the mostly basic useful materials with which the invention is concerned where drying gases containing waste gas are used.

In other embodiments, the invention relates to the use of this process for obtaining free-flowing surfactant solids, more particularly from the field of anionic surfactants based on natural materials, and also to its use for obtaining dried silicate-base useful materials which may be used in particular in laundry detergents and, finally, to the use of the described process for obtaining so-called laundry detergent

DETAILED DESCRIPTION OF THE INVENTION

The technical teaching with which the present disclosure is concerned is a further development of earlier application DE-A 40 30 688 which has already been repeatedly cited. In the interests of completeness of disclosure of the present invention, the disclosure of that earlier application is hereby also specifically included as part of the disclosure of the present invention. In addition, the following process elements are important:

Under the working conditions according to the invention, drying with the superheated steam may also be carried out on the one hand as spray drying and/or on the other hand as fluidized bed drying. Starting materials of comparatively high water content are present, for example, as flowable and sprayable aqueous solutions, emulsions and/or suspensions of the useful materials or mixtures of useful materials to be dried. In one important embodiment, starting materials of this type are subjected to spray drying technology known per se. The spray drying process may be carried out in co-current or in countercurrent in correspondingly equipped spray drying towers. In general, the countercurrent principle is also preferably applied in the process according to the invention using superheated steam as the hot drying gas.

Under the spray drying conditions, it is preferred in accordance with the invention indirectly to introduce the energy required for evaporation into the steam circuit at least predominantly outside the drying zone. This safeguards the result known from conventional spray drying that the fluid, wet starting material can be dried in fine particle form without the particles adhering significantly to one another or at least with controllable adjustment of the particle size. The energy introduced into the steam circuit outside the fluidized bed may be introduced in any known form of indirect heat transfer. The use of tube-bundle systems, through which heating gases of any origin on the one hand and—separately therefrom—the steam to be heated on the other hand flow, is mentioned as an example.

In one particularly important embodiment of the invention, this indirect introduction of energy into the steam circuit is carried out by one or more integrated burners with indirect transfer of heat to the steam, the hot combustion gases being directly introduced into the heat exchanger—integrated in the steam circuit—on the burner side. The temperature of the combustion gases may be, for example, in the range from about 400° to 1000° C. and, more particularly, is in the range from about 650° to 960° C. In the interests of optimal heat utilization and hence to reduce the costs of the process as a whole, it can be useful if the waste gases are also partly and, preferably, substantially completely circulated. For example, at least 30% by volume and preferably more than 40% by volume of the hot waste gases can be recirculated after leaving the integrated heat exchanger for the further utilization of energy. The quantity of waste gases recirculated preferably amounts to more than 60% by volume and often to around 70% by volume of the combustion gases introduced. The burner may be operated with any of the usual fuel gases, more particularly natural gas or comparable lower hydrocarbons or hydrocarbon mixtures and/or hydrogen.

If, on the other hand, the drying principle according to the invention is applied in fluidized bed drying, the necessary heating of the steam-based drying gas may be accomplished both outside the drying zone and with heat-exchanger elements integrated into the fluidized bed. These two gas heating mechanisms may also be combined with one another.

The preferred embodiment of the process according to the invention carried out at normal pressure provides for comparatively uncomplicated operation, even in industrial plants, with the necessary high throughputs per unit of time. The measure preferably applied in accordance with the invention of slightly elevating the internal pressure reliably prevents the unwanted entry of foreign gases, particularly air, into the steam-filled circuit. Secondary damage to the high product quality required can also thus be reliably prevented. Suitable working pressures are at excess pressures of, for example, in the range up to about 150 mbar, preferably up to about 75 mbar and, more preferably, below 50 mbar. The range from about 5 to 15 mbar excess pressure can be of particular advantage. Drying with superheated steam in accordance with the invention is of course also possible in principle at reduced pressures, particularly moderate reduced pressures, although in this case increased outlay on equipment is necessary for ensuring the absence of possible damaged areas in the circuit which could initiate the unwanted penetration of air. The figures relating to the preferred excess pressure ranges apply accordingly in this case.

In other respects, the process according to the invention may largely be carried out in accordance with applicants' earlier patent application cited at the beginning for drying the mixtures of useful materials in question with superheated steam as the drying gas. To complete the disclosure of the invention, the relevant passages of that earlier application are reproduced herein where necessary:

In the earlier application, the fact that optimal drying results by the action of hot steam in the end product of the process are not essential is regarded as crucial to understanding the teaching of drying mixtures of useful materials of the type in question with superheated steam. Basically, the same also applies to the teaching according to the invention. However, it has been found that, providing such troublesome factors as waste gases and air or oxygen are reliably ruled out, even mixtures which, under conventional drying conditions with hot gases, tended to enter relatively quickly into unwanted reactions, for example discoloration, encrustation and the like, are comparatively immune to temperature. For drying with superheated steam, this means that safe operation both with superheated steam at comparatively high temperatures and degrees of drying to minimal residual moisture contents are possible without any adverse effect on the quality of the end product. Thus, residual moisture contents distinctly below 1% by weight, for example down to about 0.5% by weight or even lower, can be established in the dry material. At the same time, working temperatures of the used steam issuing from the drying zone above 100° to 110° C., preferably above 150° C. and, more preferably, above 180° C. can be applied.

Nevertheless, even fairly significant residual moisture contents can be tolerated providing the composition of the material ensures that the residual water is bound by a form of "internal drying" to such an extent that the long-term pourability and free flow of the dry material is guaranteed.

As described in the earlier application, the teaching of the invention also provides for after-treatment of the partly dried granules initially obtained in addition to or instead of this auxiliary measure. The aftertreatment may be carried out by two methods which may even be combined with one another.

The first of these methods is based on the fact that the individual degree of drying of the particular particle in question is determined by its particle size. If, in accordance with the invention, the drying process is terminated at a time when considerable quantities of residual moisture are still present in the material, integral consideration of the residual moisture content does only partial justice to reality. By differential consideration of the distribution of this residual moisture over the individual fractions of material, it has been found that the fine or ultrafine fractions can be dried very extensively or completely while the coarser fractions still contain such considerable quantities of moisture that the material removed from the spray drying zone is not guaranteed long-term pourability and free flow. In one important embodiment of the process according to the invention, therefore, "after-drying" of the primary material from the spray drying zone is achieved by an additional treatment step which—without exposing the powder-form material to the risk of developing tackiness—leads to homogenization of the moisture content over the material as a whole irrespective of the individual particle size. In this way, so much residual moisture can be introduced into the fine and ultrafine material from the still comparatively moist coarse particles of the material that, after this homogenization step, the long-term pourability and free flow of the dried material are guaranteed without further quantities of moisture having to be additionally eliminated from the bulk material.

This aftertreatment step may be carried out by any method which equalizes the moisture content of the individual particles and, at the same time, prevents them from adhering to one another. Circulation or shaking of the material initially obtained either continuously or discontinuously are mentioned as examples of such methods. Aftertreatment of the material in a fluidized bed having a very much higher solids density by comparison with spray drying can be particularly suitable. Any gases, preferably ambient air, may be used for this purpose. Damage to the material by oxidation and unwanted contamination of the waste air is nonexistent or minimal and easy to control. Since the material to be dried is removed from the spray drying zone at elevated temperature, typically of the order of 100° C., a further slight reduction in the residual moisture content can be obtained by this subsequent homogenization of moisture in a fluidized bed, for example with ambient air.

However, in addition to or instead of this auxiliary measure, provision can also be made in the process according to the invention for a further reduction in the residual moisture content by additional drying. If after-drying proves to be desirable, one such additional after-drying step will generally be sufficient. However, after-drying in a sequence of additional steps is not ruled out from the teaching of the invention. The after-drying step(s) is characterized in that it is carried out under conditions which do not significantly endanger the useful materials in the material to be dried. In principle, several process parameters are available for reducing that risk, including for example reducing the temperature of the hot gas phase, dispensing with superheated steam as the hot gas and replacing it with drying gases of different origin, for example air and/or inert gas, and changing over to another drying technology.

In one preferred embodiment of the process according to the invention, the solids density of the material to be dried in the hot gas stream is substantially increased where such an after-drying step is used, so that, in this after drying step, the process principles of fluidized bed drying follow spray drying from the first drying stage. This subsequent fluidized bed drying step may in turn be carried out with any drying gases. In the preferred embodiment of the invention, superheated steam is used as the hot gas in this step also. However, the intensive exchange of heat between the now comparatively closely packed solid particles can thus effectively counteract unwanted overheating of the material to be dried and, more particularly, the danger of overheating of the fine particles of that material. In preferred embodiments of the invention, it is again possible through the composition of the material to be dried to ensure that the elements of the "internal drying" discussed above can be used to bind any residual moisture still present.

Aqueous preparations of useful materials and combinations thereof from the field of wetting agents, detergents and/or cleaning products which are not damaged significantly, if at all, by brief exposure to water or steam at a material temperature of 100° to 120° C. are particularly suitable for use in the process according to the invention. Components of this type which are not damaged by exposure to temperatures in the range mentioned for at least about 0.5 to 1 min. under the working conditions are particularly suitable useful materials. By controlling the process parameters—in addition to the design of the spray-drying zone, the working temperature range used in accordance with the invention and the droplet or particle size of the sprayed material are mentioned by way of example—it is possible to select residence times of a matter of seconds for the particular particles under the conditions of the superheated steam. It is crucial that the period of exposure to temperatures in this range is kept so short in the process according to the invention that no substantial damage to the material to be dried occurs under the working conditions selected. For example, even surfactant compounds which are basically vulnerable to hydrolysis are largely undamaged by exposure to these working conditions for a few minutes. Thus, aqueous preparations of water-soluble and/or insoluble organic and/or inorganic useful materials from wetting agents, detergents and/or cleaning products which may be assigned, for example, to the following classes may be subjected to drying in the drying process according to the invention: surfactant or emulsifier components, inorganic and/or organic builders or builder components, washing alkalis, fillers or neutral salts, fabric softeners, bleach activators, auxiliaries for improving the soil suspending power of the liquors, such as redeposition inhibitors or even abrasives.

If it is necessary to retain considerable quantities of water in the product subjected to the main drying process and hence to bind this residual water to ensure the long-term pourability and free flow of the dried material, auxiliaries capable of fixing water, preferably in the form of particulate solids, are used in accordance with the invention. In this case, residual water may be fixed, for example, by binding as water of crystallization. However, limited quantities of water in solid particles of the type in question here can also be bound purely by absorption without causing any unwanted tackiness or adhesion of the particles to one another. The auxiliaries are at least used in quantities sufficient to guarantee pourability and stability in storage despite the residual moisture present in the material.

In one embodiment of the invention, the auxiliaries used to bind the residual water may be added to the dried fresh material, best immediately after it has been removed from the process, and intensively mixed therewith. In preferred embodiments, however, the auxiliaries binding the residual water are at least partly, preferably at least predominantly or, in general, completely added to the aqueous preparations of useful material before they are dried. This particular embodiment may always be applied when the particular temperature sensitivity of the material to be dried allows drying to be carried out to such an extent that the residual moisture remaining in the product can be adequately absorbed and bound by the auxiliaries used.

In one embodiment of the process according to the invention of particular advantage in this regard, corresponding useful materials from the field of wetting agents, detergents and/or cleaning products which themselves are sufficiently immune to temperature are used as the auxiliaries capable of binding residual water. Typical examples of such materials are inorganic materials capable of binding water of crystallization from the classes of builder components, washing alkalis and/or so-called fillers. Typical examples of the subclasses of useful materials listed here are silicate compounds capable of binding water of crystallization, more particularly from the class of zeolites. One example particularly characteristic of laundry detergents is detergent-quality zeolite NaA which has a calcium binding power of 100 to 200 mg CaO/g (cf. DE 24 12 837). Typical examples of washing alkalis which bind water of crystallization are soda or sodium bicarbonate while sodium sulfate as neutral salt or filler has a pronounced capacity for binding considerable quantities of water of crystallization. However, in addition to or instead of the above-mentioned auxiliaries capable of binding water of crystallization, the residual water may also be bound by auxiliaries or corresponding useful materials capable of binding water by absorption. Thus, it is known that typical starch- or cellulose-based redeposition inhibitors, fabric softeners, particularly those based on inorganic swellable silicates, and also a number of organic surfactant compounds which are solid under normal conditions are capable of absorbing considerable quantities of water without reacting by developing unwanted surface tackiness.

Depending on the temperature sensitivity of the useful materials or mixtures of useful materials used on the one hand and the nature and quantity of the auxiliaries used on the other hand, considerable residual water contents may remain in the dried fine-particle material without endangering its long-term pourability and free flow. According to the invention, therefore, drying with superheated steam is terminated at residual water contents of the material removed from the spray drying zone in the range from about 0.5 to 20% by weight, residual water contents in the range from about 5 to 12% by weight being preferred. The % by weight ranges mentioned relate to the weight of the fine-particle material removed from the spray drying zone. In another preferred embodiment of the invention, however, the amount of residual water which is not bound as water of crystallization is limited. Thus, it can be useful to limit this water content to at most about 10% by weight, preferably to no more than about 5 to 7% by weight and better still to values of at most about 1 to 3% by weight. Once again, the foregoing observations apply to the percentages by weight. Taking into account specialist knowledge of the field in question, the combination of desired properties is thus reliably achieved using superheated steam at high working temperatures: adequate drying at moderate temperatures, termination of the drying reaction even when considerable quantities of residual moisture are still present in the material, so that unwanted temperature effects are ruled out, and establishing long-term pourability and free flow in accordance with practical requirements.

As already mentioned, the process according to the invention offers additional possibilities for establishing the particular residual moisture content required which may be applied in addition to or instead of the principles of inner drying discussed in the foregoing. These alternative possibilities include the homogenization and/or step-by-step reduction in the moisture content of the material to be dried, the spray drying step being followed by one or more after drying steps which discharge troublesome quantities of moisture under comparatively moderate working conditions. Basically, any of the after drying techniques known to the expert in direct or indirect contact with hot gases are suitable for this purpose. In the preferred alternative of the process according to the invention, superheated steam is also used for after drying, best in an additional step. In order not to endanger the temperature-sensitive material, the temperature at which the superheated steam is used may be lower than in the spray drying stage. However, the following alternative has proved to be particularly successful:

The fine-particle material which still has an excessively high residual moisture content is removed from the spray drying zone and transferred to a following fluidized bed drying stage. Partial agglomeration of the still sufficiently moist material from the spray drying zone into a relatively coarse agglomerate is entirely acceptable or may even be desirable in a preferred embodiment of the teaching according to the invention. A partial agglomeration step may be used in particular to bind the fine component of the material removed from the spray drying zone and to combine it, for example, with the more moist coarse particles of the primary drying product. The following fluidized bed drying stage is carried out in known manner with the greatly increased solid densities in the drying zone which lead to the intensive exchange of heat between all the solid particles of the fluidized bed and, in this way, prevent unwanted increases in temperature in part of the granular material to be dried, even when steam which has been heated to comparatively high temperatures is again used as the drying gas.

In the after drying stage in the fluidized bed, limited quantities of residual moisture merely have to be removed to ensure the long-term free flow of the granular material, so that the residence time of the material in this fluidized bed aftertreatment can also be kept short, amounting for example to only a few minutes. Main drying in the spray drying zone and after drying in the fluidized bed may be carried out together in a continuous process or may even be carried out independently of one another as separate process steps. General specialist knowledge may be used in this regard.

In the second drying stage, the residual moisture still present may be partly or substantially completely removed. In practical embodiments, at least about 10 to 80% and preferably about 20 to 70% (based on the residual moisture) of the residual moisture present in the material removed from the spray drying zone is removed where this modification of the process is applied. Traces of moisture remaining in the material are rendered harmless by the internal drying.

In one important embodiment, the process according to the invention is used to dry mixtures of useful materials for the production of laundry detergents. The aqueous starting materials to be dried contain washing-active surfactants together with builders and, optionally, washing alkalis and/or neutral salts. At least part of the multicomponent mixtures used is capable of binding and/or fixing residual water, more particularly in the form of water of crystallization. As in the spray drying of laundry detergents, the laundry detergent component of mixtures of the type in question is generally not exposed in its entirety to fluidized-bed spray granulation. This is precluded by the extreme temperature sensitivity of peroxide-containing bleach components, such as perborate monohydrate or tetrahydrate, and corresponding other particularly temperature-sensitive components. Enzymes, fragrances, bleach activators and other minor components are mentioned as further examples. Accordingly, the teaching of the present invention also provides inter alia for the production of so-called multicomponent tower powders which contain a large part of the components making up the final detergent in admixture with one another, but which are subsequently treated or mixed with other, liquid and/or solid active components. Known examples of such liquid components are, in particular, readily volatile nonionic surfactant components which, although no longer discharged into the environment with the waste gas in the process according to the invention, can nevertheless readily be added to the detergent as a whole by subsequent spraying onto absorbent tower powder which has been prepared in accordance with the invention.

The working conditions of the process according to the invention enable high temperatures to be used for the circulated steam phase in the drying step of the spray drying process. The working temperatures of the steam used are generally above 150° C. and preferably at least about 200° C. in the gas phase. Working temperatures of 250° C. and higher can be particularly interesting and even temperatures of at least 300° C. and more particularly in the range from 300° to 380° C. may be applied. In many cases, working temperatures in the range from about 270° to 350° C. in the steam phase are particularly suitable. All these temperature values relate to the temperature of the steam heated to optimal temperature which is delivered to the spray drying zone in co-current or countercurrent. The temperature of the steam falls in known manner during its contact with the wet or moist material. Considerations based largely on energy factors, including the intended subsequent use of the steam to be removed from the circuit, determine the quantitative ratios between the quantity of water to be evaporated and the quantity of superheated steam delivered. Embodiments which provide only for a limited reduction in the steam temperature after leaving the spray drying zone to values in the range from about 190° to 250° C. are possible in this regard whereas, in other embodiments, the thermal energy of the steam can advantageously be further utilized to reduce the temperature of the steam to the vicinity of the condensation temperature under process conditions (100° to 110° C.). More specifically, these details are determined inter alia by the design of the recycle process as a whole. Corresponding considerations apply to the use of superheated steam as the hot gas in an optional after-drying stage in the fluidized bed process. The figures mentioned above apply in this case also.

Basically, it may be said in respect of these considerations that the process is carried out in a closed-loop system with a steam circuit from which the water evaporated from the starting material is removed while the energy released in particular during the drying step is directly returned to the circuit. In one important embodiment, the steam removed is freed from entrained particles of material and put to another use as process steam, if desired after its pressure and temperature have been adapted to the required conditions. In another embodiment of the process according to the invention, the steam removed is at least partly condensed and freed from entrained particles of material. The liquid phase accumulating may be recycled to the drying process together with any of the useful material present therein. In this connection, it is possible, for example, to use vaporous fractions of the gas stream removed from the circuit to concentrate the aqueous liquid phase. The liquid recycled together with the useful material present therein may be directly delivered to the spray drying zone or may first be mixed with the fresh aqueous preparations and introduced in this form into the spray drying zone for drying.

In one particularly interesting embodiment of the invention, the heat of condensation of the steam removed from the circuit is recovered and utilized. By adopting suitable measures, it is even possible to recycle the small amounts of useful material which have left the primary steam circuit via the superheated steam removed therefrom. To this end, the following procedure, for example, may be adopted using the heat of condensation of the steam removed from the circuit:

Using the heat of condensation of the steam removed from the circuit, the steam condensate is concentrated in a preferably multiple-stage evaporation unit. The residual concentrate accumulating is returned to the primary process circuit. More particularly, this residual concentrate may be added to the slurry of useful material to be dried by superheated steam.

If necessary, a residual gas phase, if any, accumulating with minimal amounts of useful material during condensation of the superheated steam removed from the primary circuit may be subjected to subsequent working up during the condensation process, for example to incineration, treatment in biofilters or in washing units. By this combination of substantially complete recycling of the particular streams and the reliable destruction of final residual traces in the comparatively limited quantities of non-condensable gases, the process according to the invention makes it possible for the first time in the industrial field with which the invention is concerned to recover useful materials and mixtures of useful materials from the field of detergents and cleaning products free from waste air and free from polluted wastewater.

Irrespective of this and in addition to these considerations, the method according to the invention provides for appreciable savings of energy by comparison with conventional hot gas drying. Thus, through the circulation of steam at a comparatively high temperature level (for example 130+/−30° C.), the amount of heat to be introduced in the recycle process per kilogram of water to be evaporated is reduced by 10 to 25% by comparison with conventional drying processes involving only a single passage of the hot drying gases. In addition to the absence of pollutants, therefore, the process according to the invention satisfies further requirements of modern technology for processes carried out on an industrial scale.

General particulars of useful materials for direct or indirect use in the production of wetting agents, detergents and/or cleaning products using the principles according to the invention are given in the following with reference to typical components of modern laundry detergents.

Suitable anionic surfactants are, for example, soaps of natural or synthetic, preferably saturated, fatty acids. Soap mixtures derived from natural fatty acids, for example coconut oil fatty acid, palm kernel oil fatty acid or tallow fatty acid, are particularly suitable. Soap mixtures of 50 to 100% saturated $C_{12-18}$ fatty acid soaps and 0 to 50% oleic acid soap are preferred.

Other suitable anionic surfactants are those of the sulfonate and sulfate type. The process according to the invention can have particular significance for corresponding compounds of vegetable and/or animal origin.

Suitable surfactants of the sulfonate type are alkylbenzene sulfonates ($C_{9-15}$ alkyl), olefin sulfonates, i.e. mixtures of alkene and hydroxyalkane sulfonates, and sulfonates of the type obtained, for example, from $C_{12-18}$ monoolefins with a terminal or internal double bond by sulfonation with gaseous sulfur trioxide and subsequent alkaline or acidic hydrolysis of the sulfonation products. Also suitable are the alkane sulfonates obtainable from $C_{12-18}$ alkanes by sulfochlorination or sulfoxidation and subsequent hydrolysis or neutralization or by addition of bisulfites onto olefins and, more particularly, the esters of α-sulfofatty acids (ester sulfonates), for example the α-sulfonated methyl esters of hydrogenated coconut oil, palm kernel oil or tallow fatty acids.

Other important surfactant and emulsifier components in this regard are the so-called disalts which may be obtained by saponification of the above-mentioned α-sulfonated fatty acid methyl esters or by direct sulfonation of fatty acids, more particularly saturated $C_{12-18}$ fatty acids. The process according to the invention thus makes it possible for the first time for surfactants of the type described here and in the following based on natural materials to be made available without difficulty on an industrial scale in the form of dry free-flowing concentrates which have virtually unlimited storage life and hence make a significant contribution to the universally desired replacement of ABS.

Suitable surfactants of the sulfate type are the sulfuric acid monoesters of primary alcohols of natural and synthetic origin, i.e. of fatty alcohols, for example coconut oil fatty alcohols, tallow fatty alcohols, oleyl alcohol, lauryl, myristyl, palmityl or stearyl alcohol, or the $C_{10-20}$ oxo alcohols and those of secondary alcohols having the same chain length. Sulfuric acid monoesters of the alcohols of natural and/or synthetic origin ethoxylated in particular with 1 to 6 moles of ethylene oxide are also suitable components. Such compounds as 2-methyl-branched $C_{9-11}$ alcohols containing on average 3.5 moles of ethylene oxide are mentioned as an example of synthetic alcohols. Sulfated fatty acid monoglycerides are also suitable.

The anionic surfactants may be present in the form of their sodium, potassium and ammonium salts and also as soluble salts of organic bases.

Suitable nonionic surfactants are adducts of 1 to 40 moles and preferably 2 to 20 moles of ethylene oxide with 1 mole of an aliphatic compound essentially containing 10 to 20 carbon atoms from the group consisting of alcohols, carboxylic acids, fatty amines, carboxylic acid amides or alkane sulfonamides. Of particular importance are the adducts of 8 to 20 moles of ethylene oxide with primary alcohols, for example with coconut oil or tallow fatty alcohols, with oleyl alcohol, with oxo alcohols or with secondary alcohols containing 8 to 18 and preferably 12 to 18 carbon atoms. In addition to the water-soluble nonionics, however, water-insoluble or substantially water-insoluble polyglycol ethers containing 2 to 7 ethylene glycol ether units in the molecule are also of interest, particularly when they are used together with water-soluble nonionic or anionic surfactants. In the process according to the invention, the tendency of nonionic surfactants such as these to be carried over can be taken into consideration by completely or partly applying components of this type to the granules obtained after spray drying. The same also applies in particular to nonionic surfactants liquid at room temperature.

Other suitable nonionic surfactants are alkyl glycosides corresponding to the general formula $R-O-(G)_x$, in which R is a primary linear or branched aliphatic radical containing 8 to 22 and preferably 12 to 18 carbon atoms, G stands for a glycose unit containing 5 or 6 carbon atoms and the degree of oligomerization x is between 1 and 10.

Suitable organic and inorganic builders are soluble and/or insoluble components showing a mildly acidic, neutral or alkaline reaction which are capable of precipitating or complexing calcium ions. Suitable and, in particular, ecologically safe builders are finely crystalline synthetic zeolites of the type already mentioned. Other builder components which, in particular, may be used together with the zeolites include (co)polymeric polycarboxylates, such as polyacrylates, polymethacrylates and, in particular, copolymers of acrylic acid with maleic acid, preferably those with 50% to 10% maleic acid. The molecular weight of the homopolymers is generally in the range from 1,000 to 10,000 while the molecular weight of the copolymers is in the range from 2,000 to 200,000 and preferably in the range from 50,000 to 120,000, based on free acid. A particularly preferred acrylic acid/maleic acid copolymer has a molecular weight of 50,000 to 100,000. Suitable, but less preferred compounds of this class are copolymers of acrylic acid or methacrylic acid with vinyl ethers, such as vinyl methyl ether, in which the acid makes up at least 50%. Other suitable builders are polyacetal carboxylic acids, for example of the type described in U.S. Pat. Nos. 4,144,226 and 4,146,495, and also polymeric acids which are obtained by polymerization of acrolein and subsequent disproportionation with alkalis and which are made up of acrylic acid units and vinyl alcohol units or acrolein units.

Suitable organic builders are, for example, polycarboxylic acids which are preferably used in the form of their sodium salts, such as citric acid and nitrilotriacetate (NTA), providing there are no ecological objections to their use.

In cases where a phosphate content can be tolerated, it is also possible to use phosphates, more particularly pentasodium triphosphate, and even pyrophosphates and orthophosphates which act primarily as precipitants for lime salts.

Suitable inorganic non-complexing salts are the bicarbonates, carbonates, borates or silicates of the alkali metals which are also known as "washing alkalis". Of the alkali metal silicates, sodium silicates with an $Na_2O$ to $SiO_2$ ratio of 1:1 to 1:3.5 are particularly suitable. From the remaining groups of typical detergent ingredients, components from the classes of redeposition inhibitors (soil suspending agents), neutral salts and fabric softeners are particularly suitable for use in the process according to the invention.

Suitable redeposition inhibitors are, for example, carboxymethyl cellulose, methyl cellulose, methyl hydroxyethyl cellulose and mixtures thereof. The above-mentioned sodium sulfate is cited as a typical example of a suitable representative of the neutral salts. Suitable softeners are, for example, swellable layer silicates of the montmorillonite type, for example bentonite.

As mentioned above, typical ingredients of detergents and cleaning preparations sensitive to high temperatures and/or liquid at room temperature, such as liquid nonionic surfactant components, bleaches based on per compounds, enzymes from the class of proteases, lipases and amylases, or bacterial strains or fungi, stabilizers, fragrances, temperature-sensitive dyes and the like, are best mixed with the dry powders obtained beforehand.

EXAMPLES

In an experimental pilot-plant-scale spray-drying tower of the "Minor Production" type manufactured by Niro-Atomizer, a powder-form detergent, so-called "tower powder", was produced by spraying detergent slurry in superheated steam. Before entering the dryer, the circulated steam was passed through a superheater with indirect heat exchange. The solids component of the detergent slurry contained 16% by weight surfactants, approx. 20% by weight soda and zeolite NaA, waterglass, Sokalan® and typical minor components. The water content of the slurry was 50% by weight. The slurry was sprayed into the dryer through a hollow cone nozzle ($D_N$=0.7 mm, spray cone approx. 45°) under a spraying pressure of 6 bar. The feed stream of slurry was adjusted to 20.8 kg/h (16 l/h) at a temperature of 60° C. The throughput of superheated steam for drying was 181.1 kg/h. The entry temperature $T_E$ was 350° C. and the exit temperature $T_A$ was 184° C. This corresponds to a steam feed rate of 60132 kJ/h.

A powder having a dry matter content (DM) of 92.4% by weight was obtained so that the evaporation rate was 9.66 kg/h. The specific energy consumption of the spray dryer was 6226.8 kJ/kg. The product may be characterized by the result of sieve analysis:

larger than 1.6 mm 0.45
 larger than 0.8 mm 6.71
 larger than 0.4 mm 15.86
 larger than 0.2 mm 29.72
 larger than 0.1 mm 40.31
 0.1 mm and smaller 7.14

The powder thus produced had an apparent density of 407.0 g/l.

During the test, a condensate stream of approx. 8.5 kg/h was collected at the condenser. This corresponds to a heat recovery of 20574.6 kJ/h.

We claim:

1. A process for the drying of water-containing materials which are suitable for use as wetting agents, detergents or cleaning products, comprising drying an aqueous solution, emulsion or suspension of said materials using superheated steam as the drying gas wherein said drying gas is recycled to the drying zone after removal therefrom of evaporated water and the energy required for the evaporation of water is supplied to said superheated steam by heat exchangers.

2. The process as in claim 1 wherein said drying step is conducted in a spray-drying apparatus, and the energy required for the evaporation of water is supplied to said superheated steam by indirect heat exchangers located outside the drying zone.

3. The process as in claim 1 wherein said drying step is conducted in a fluidized bed drying apparatus, and the energy required for the evaporation of water is supplied to said superheated steam by heat-exchange surfaces integrated into said fluidized bed drying apparatus.

4. The process as in claim 1 wherein said drying step is carried out at ambient pressure in a closed-loop system comprising a steam circuit from which the water evaporated from said aqueous solution, emulsion or suspension of said materials is removed as a partial stream and the thermal energy released during the drying step is returned to said steam circuit, and the granules are discharged from the drying apparatus before they can be damaged by heat.

5. The process as in claim 4 wherein the temperature of said steam circuit is kept in the range from about 100° C. to 450° C.

6. The process as in claim 4 wherein said drying gas exits said drying zone at a temperature of at least 150° C.

7. The process as in claim 1 wherein drying of said materials is terminated before they are damaged by heat, and the long-term pourability and free flow of the materials thus partly dried being ensured by the addition thereto of mixture components which are capable of binding limited quantities of water or by a post-treatment to homogenize the residual moisture content in the particulate material or by post-drying the particulate material under conditions which do not adversely affect the materials.

8. The process as in claim 1 wherein said materials are selected from the group consisting of surfactants, emulsifiers, inorganic and organic builders, washing alkalis, fillers, neutral salts, fabric softeners, bleach activators, soil redeposition inhibitors and abrasives.

9. The process as in claim 1 including adding to said materials auxiliaries in the form of particulate solids which are capable of fixing residual water as water of crystallization or by absorption.

10. The process as in claim 9 wherein said auxiliaries are at least partly added to said aqueous solution, emulsion or suspension of materials before said drying step.

11. The process as in claim 9 wherein said auxiliaries are selected from the group consisting of wetting agents, detergents and cleaning products.

12. The process as in claim 2 wherein a material containing residual water discharged from the spray drying apparatus is subjected to an at least one-stage post-treatment which results in homogenization of the residual moisture in the material, said post-treatment being carried out in fluidized-bed drying apparatus operated with superheated steam as the drying gas.

13. The process as in claim 1 wherein said drying step is terminated at residual moisture contents of about 0.5 to 20% by weight, based on the weight of the materials removed from the drying zone.

14. The process as in claim 1 wherein individual components of said materials are obtained as a free-flowing dry material.

15. The process as in claim 1 wherein mixtures of said materials for the production of laundry detergents are dried.

16. The process as in claim 1 wherein said superheated steam has an entry temperature of at least about 200° C.

17. The process as in claim 4 wherein the heat of condensation of the steam removed from said steam circuit is at least partly recovered and returned to the steam circuit.

18. The process as in claim 1 wherein said drying step is conducted for about 0.5 to 1 minute.

* * * * *

UNITED STATES PATENT AND TRADEMARK OFFICE
CERTIFICATE OF CORRECTION

PATENT NO. : 5,537,759
DATED : July 23, 1996
INVENTOR(S) : Raehse et al.

It is certified that error appears in the above-indentified patent and that said Letters Patent is hereby corrected as shown below:

On the cover page, left-hand column, under [87], the PCT Pub. Date should be corrected from "Aug. 19, 1994" to --Aug. 19, 1993--.
In column 14, claim 6, line 6, "claim 4" should be corrected to read --claim 1--.

Signed and Sealed this

Eleventh Day of November, 1997

Attest:

BRUCE LEHMAN

Attesting Officer

Commissioner of Patents and Trademarks